US008484648B2

(12) United States Patent
Divirgilio et al.

(10) Patent No.: US 8,484,648 B2
(45) Date of Patent: Jul. 9, 2013

(54) HARDWARE MULTI-THREADING CO-SCHEDULING FOR PARALLEL PROCESSING SYSTEMS

(75) Inventors: John Divirgilio, Washingtonville, NY (US); Liana L. Fong, Irvington, NY (US); John Lewars, New Paltz, NY (US); Seetharami R. Seelam, Yorktown Heights, NY (US); Brian F. Veale, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 12/581,694

(22) Filed: Oct. 19, 2009

(65) Prior Publication Data

US 2011/0093638 A1 Apr. 21, 2011

(51) Int. Cl.
*G06F 9/46* (2006.01)
*G06F 13/24* (2006.01)

(52) U.S. Cl.
USPC ........... 718/102; 718/103; 710/260; 710/267; 710/268

(58) Field of Classification Search
USPC ................. 718/1–105; 710/260–269
See application file for complete search history.

(56) References Cited

U.S. PATENT DOCUMENTS

| 5,600,822 | A | | 2/1997 | Grice et al. | |
|---|---|---|---|---|---|
| 5,694,604 | A | * | 12/1997 | Reiffin | 718/107 |
| 2003/0200250 | A1 | * | 10/2003 | Kiick | 709/102 |
| 2004/0148390 | A1 | * | 7/2004 | Cleary et al. | 709/224 |
| 2004/0205272 | A1 | * | 10/2004 | Armstrong et al. | 710/260 |
| 2005/0125582 | A1 | * | 6/2005 | Tu et al. | 710/260 |
| 2005/0131865 | A1 | * | 6/2005 | Jones et al. | 707/2 |
| 2006/0056290 | A1 | * | 3/2006 | Hass | 370/229 |
| 2007/0300227 | A1 | * | 12/2007 | Mall et al. | 718/102 |
| 2008/0104296 | A1 | * | 5/2008 | Blackmore et al. | 710/267 |
| 2009/0198850 | A1 | * | 8/2009 | Suzuki | 710/267 |
| 2010/0095040 | A1 | * | 4/2010 | Nishita et al. | 710/267 |
| 2010/0274939 | A1 | * | 10/2010 | Egger et al. | 710/266 |

OTHER PUBLICATIONS

Raasch, et al., "Applications of Thread Prioritization in SMT Processors", pp. 1-9, in Proceedings of the 1999 Multithreaded Execution, Architecture, and Compilation Workshop, Jan. 1999.
Smith, et al., "Asymmetric Multiprocessing for Simultaneous Multithreading Processors", pp. 1-13, North Carolina State University Technical Report TR-2006-13, Jun. 20, 2006.

* cited by examiner

*Primary Examiner* — Abdullah Al Kawsar
(74) *Attorney, Agent, or Firm* — Fleit Gibbons Gutman Bongini & Bianco PL; Thomas Grzesik

(57) ABSTRACT

A method, information processing system, and computer program product are provided for managing operating system interference on applications in a parallel processing system. A mapping of hardware multi-threading threads to at least one processing core is determined, and first and second sets of logical processors of the at least one processing core are determined. The first set includes at least one of the logical processors of the at least one processing core, and the second set includes at least one of a remainder of the logical processors of the at least one processing core. A processor schedules application tasks only on the logical processors of the first set of logical processors of the at least one processing core. Operating system interference events are scheduled only on the logical processors of the second set of logical processors of the at least one processing core.

17 Claims, 7 Drawing Sheets

HARDWARE MULTI-THREADING CO-SCHEDULING FOR PARALLEL PROCESSING SYSTEMS

This invention was made with Government support under Contract No.: HR0011-07-9-0002 awarded by Defense Advanced Research Projects Agency (DARPA). The Government has certain rights in this invention.

FIELD OF THE INVENTION

The present invention generally relates to the field of data processing, and more particularly relates to application and event scheduling in a hardware multi-threading environment.

BACKGROUND OF THE INVENTION

Parallel computing is the simultaneous execution of the same task (split up and specially adapted) on multiple processors in order to obtain faster execution. Parallel computing is based on the fact that the process of solving a problem usually can be divided into smaller tasks, which may be carried out simultaneously with some coordination. Parallel applications can include some segments of instructions that must be executed serially on each node using a single thread, and other segments of instructions that can be executed in parallel on each node using multiple threads. That is, each node utilizes a single processor while executing the serial code segments and spawns threads to other processors on that node while executing the parallel code segments.

One problem with parallel computing environments and parallel applications is that a parallel application is susceptible to operating system (O/S) interference or jitter. O/S jitter is an event that is caused by the O/S that preempts or interrupts a parallel application from utilizing its assigned CPU for a period of time. Examples of these jitter events are the scheduling of daemon processes and the handling of asynchronous events such as interrupts. O/S jitter results in degradation of the performance of the parallel application.

SUMMARY OF THE INVENTION

One embodiment of the present invention provides a computer implemented method for managing operating system interference on applications in a parallel processing system. According to the method, a mapping of hardware multi-threading threads to at least one processing core is determined, and first and second sets of logical processors of the at least one processing core are determined. The first set includes at least one of the logical processors of the one processing core, and the second set includes one or more of a remainder of the logical processors of the at least one processing core. An operating system executing on a processor schedules application tasks only on the logical processors of the first set of logical processors of the one processing core. Operating system interference events are scheduled only on the logical processors of the second set of logical processors of the one processing core. xxx Another embodiment of the present invention provides an information processing system for managing operating system interference on applications in a parallel processing system. The information processing system includes a memory and a processor that is communicatively coupled to the memory. An operating system interference manager is communicatively coupled to the memory and the processor. The operating system interference manager determines a mapping of hardware multi-threading threads to at least one processing core. First and second sets of logical processors of the at least one processing core are determined. The first set includes at least one of the logical processors of the one processing core, and the second set includes one or more of a remainder of the logical processors of the at least one processing core. An operating system executing on the processor schedules application tasks only on the logical processors of the first set of logical processors of the one processing core. Operating system interference events are scheduled only on the logical processors of the second set of logical processors of the one processing core.

DETAILED DESCRIPTION

Parallel-Distributed Processing System

Figure 1:
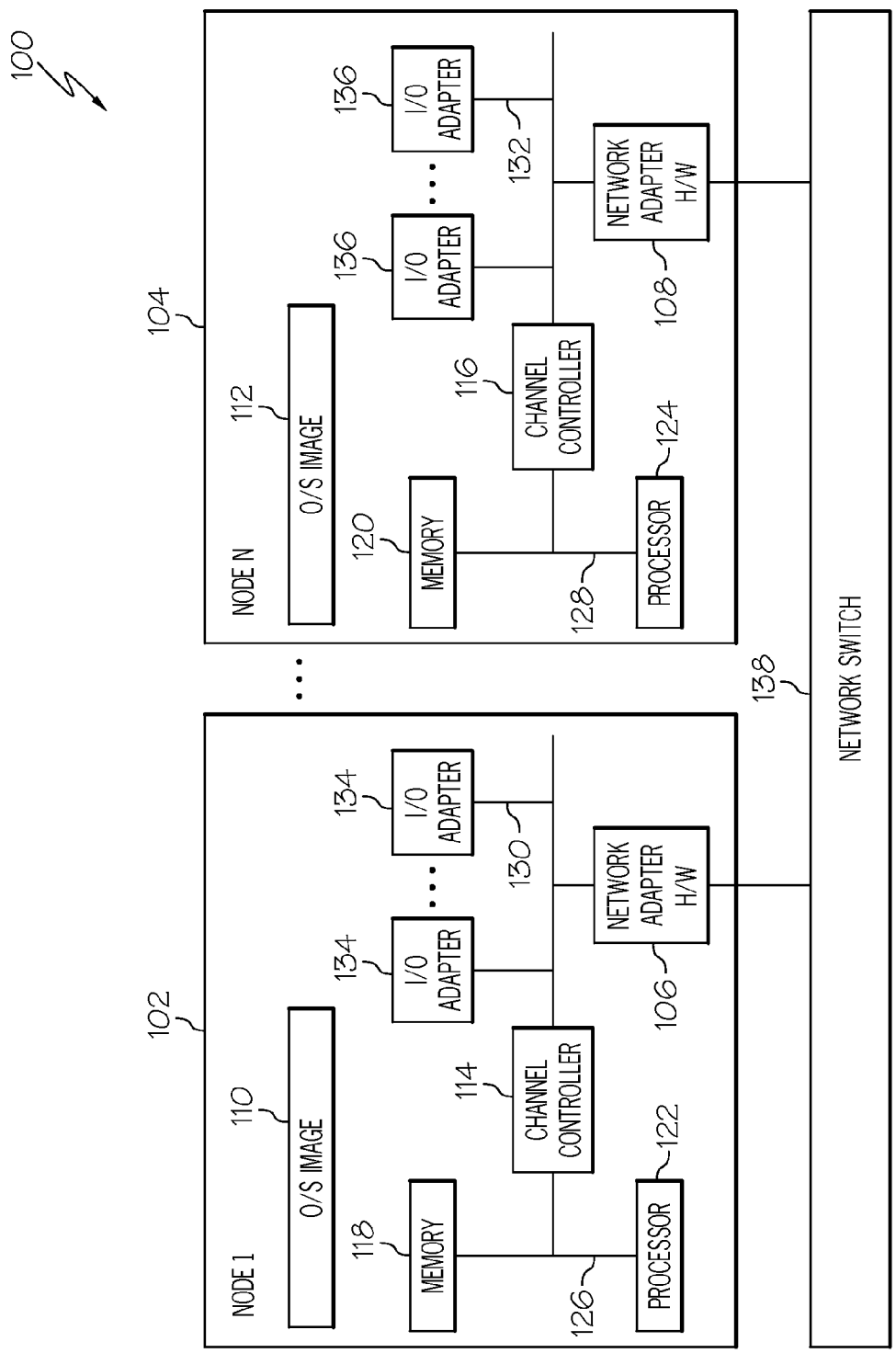
FIG. 1 is a block diagram illustrating an operating environment according to one embodiment of the present invention.

FIG. 1 shows an exemplary operating environment applicable to various embodiments of the present invention. In particular, FIG. 1 shows a parallel-distributed processing system in which one embodiment of the present invention is implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and communication adapter 106 and 108. Although only one processor 122 and 124 is shown in each processing node 102 and 104 for simplicity, each processing node 102 and 104 can have more than one processor. The communication adapters are linked together via a network switch 138. In some embodiments, the various processing nodes 102 and 104 are able to be part of a processing cluster. The present invention is not limited to an SMP environment. Other architectures are applicable as well, and further embodiments of the present invention can also operate within a single system.

Information Processing System

Figure 2:
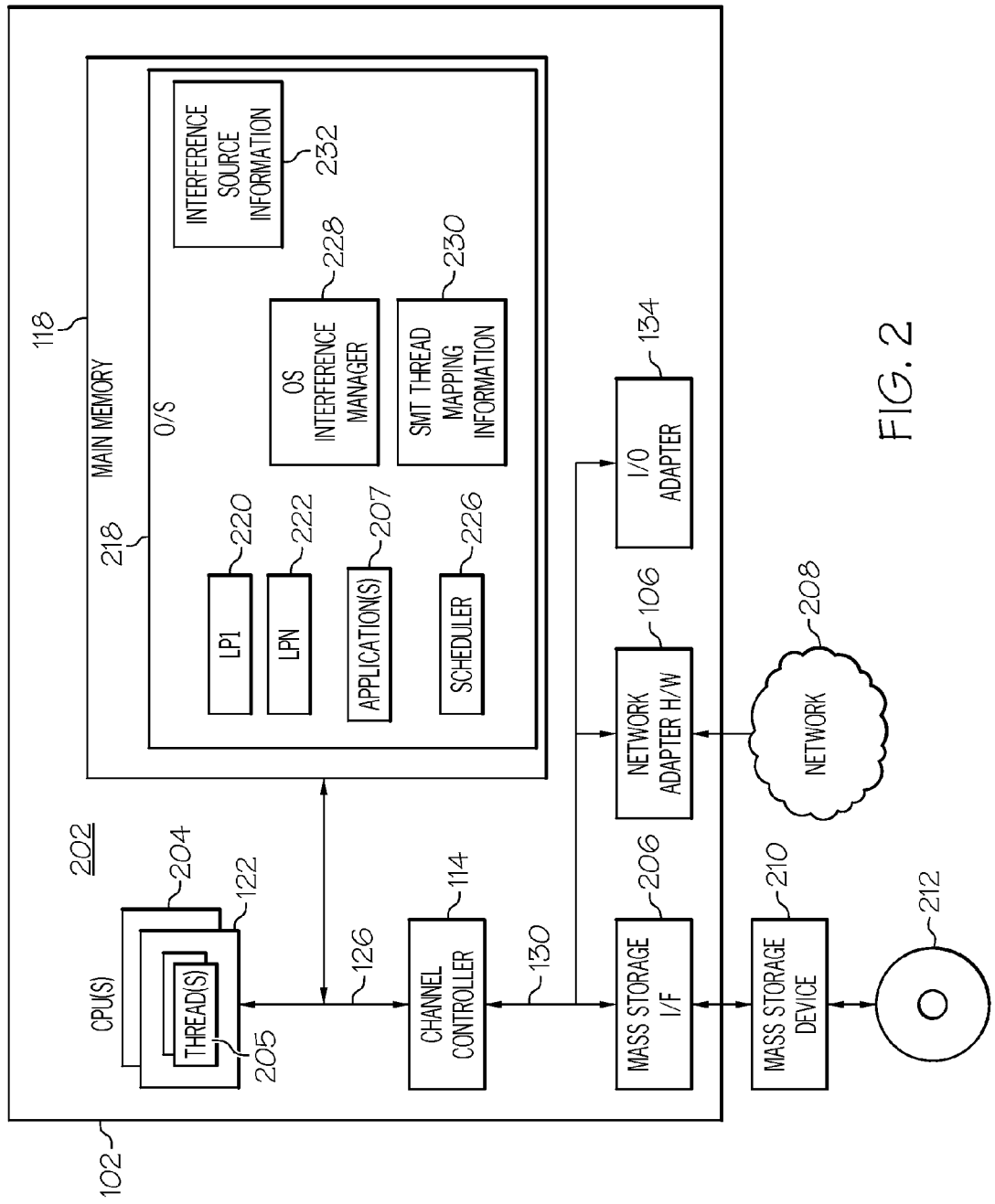
FIG. 2 is a block diagram illustrating an information processing system according to one embodiment of the present invention.

FIG. 2 is a block diagram illustrating a detailed view of an information processing system of FIG. 1 according to one embodiment of the present invention. In this exemplary embodiment, the information processing system 102 is a parallel processing system that allows parallel applications having several tasks (processes) to execute on the various processors of the information processing system 102. Any suitably configured processing system is similarly able to be used as the information processing system 102 in further embodiments of the present invention (for example, a personal computer, workstation, or the like). The information processing system 102 includes a computer 202.

The computer 202 includes several physical processors 122 and 204 that are communicatively coupled to the main memory 118 and the channel controller 114 via the system bus 126. In this embodiment, each physical processor 122 and 204 comprises one or more hardware threads 205 (e.g., SMT thread). A hardware thread 205 is a unit of software execution on a multiprocessing computer such as the information processing system 102. A hardware thread 205 is treated like an independent processor by the software executing on the computer 202. In this description, "hardware thread" and "SMT thread" are used interchangeably.

The computer 202 executes software programs such as applications 207 in units of execution called "processes" (i.e., process threads) that include all the processor registers, code segment and offset registers, data segment and offset registers, stack segment and offset registers, flag registers, instruction pointer registers, program counters, and the like that are needed for the execution of software programs. For efficiency, "processes" are often organized further into one or more process threads, where each process thread of a process individually possesses all of the attributes needed for execution, except that a thread shares memory with all of the other threads of the same process to reduce the overhead of operating system switches from process thread to process thread ("context switches").

The computer 202 also includes a mass storage interface 206, network adapter hardware 106, and an I/O adapter 124. An input/output bus 130 connects these components. The mass storage interface 206 is used to connect mass storage devices 210 to the information processing system 102. One specific type of data storage device is a computer readable medium such as a Compact Disc ("CD") drive, which may be used to store data to and read data from a CD 212 or DVD. Another type of data storage device is a hard disk configured to support, for example, JFS type file system operations.

In this embodiment, the main memory 118 is volatile memory such as random access memory ("RAM"). The main memory 118 comprises one or more applications 207, an operating system ("O/S") 218, multiple logical processors ("LP") 220 and 222, a scheduler 226, an O/S interference/jitter manager 228, SMT thread mapping information 230, and interference/jitter source information 232.

The O/S interference manager 228 reduces O/S interference/jitter effect on application processors while still maintaining core utilization and throughput. Achieving maximum utilization and throughput in an SMT environment involves avoiding cases in which two workloads have to execute serially on two separate cores. In general, it is more efficient to execute both workloads in parallel on the same core, particularly when the workloads do not use the same core resources (e.g., a floating point unit) at the same time. If the workloads do not share any core resources, they might execute at full speed without any impact on each other (assuming no other conflicts, such as cache or memory bus contention).

The O/S interference manager 228 improves performance of the parallel applications 207 by minimizing the de-synchronization among application tasks caused by hardware, O/S, runtime, and management system activities that are external to the applications 207. In one embodiment, the O/S interference manager 228 is a co-scheduler that operates with root authority which allows the O/S interference manger 228 to make privileged changes to the O/S state to effect co-scheduling of O/S jitter. The SMT thread mapping information 230 identifies the particular SMT threads 205 that are mapped to a given physical processor 122 and 204. The interference/jitter source information 232 identifies the sources of O/S interference/jitter on a physical processor 122 and 204.

The operating system 218 is the layer of system software that schedules process threads via the scheduler 226 and provides functions for making system resources available to process threads, including memory access, access to input/output resources, and the like. The operating system 218 also controls allocation and authorization for access to computer resources. The operating system 218 performs low-level basic tasks such as recognizing input from a keyboard, sending output to a display screen, keeping track of files and directories on a magnetic disk drive, and controlling peripheral devices such as disk drives and printers. The operating system 218 is also responsible for security, ensuring that unauthorized users do not access the system and that threads access only resources that they are authorized to access. Operating systems useful for scheduling threads 205 in a multi-threaded computer are multi-threading operating systems, examples of which include UNIX, Linux, Microsoft NT, AIX, and IBM's i5os.

In this embodiment, the physical processors 122 and 204 of the information processing system 102 are capable of running in a simultaneous multi-threading ("SMT") mode. In an SMT mode the physical processors 122 and 204 are capable of simultaneously accepting instructions from more than one thread of execution. In particular, SMT allows the processor hardware on a chip to be shared among multiple process threads of a multi-threaded workload. SMT is a technique that lets multiple process independent threads issue instructions to a single physical processor in a single processing cycle. An example of a processor that implements SMT is IBM's Power5 processor.

The logical processor 220 or 222, in this embodiment, is an operating system structure for scheduling process threads for execution. That is, rather than scheduling threads for execution on a physical processor or a virtual processor, the operating system 218 schedules process threads for execution on a logical processor 220 and 222. Scheduling a process thread on a logical processor 220 and 222 provides convenient structure and processing in which the process thread appears, from the point of view of the thread, to have at its disposal all of the resources of an entire logical partition.

A logical processor 220 or 222, however, is logically an entire processor (despite the fact that it is only active for a portion of the CPU cycles available on the physical processor 122 or 204). A process thread running on a logical processor 220 or 222 appears, therefore, from its point of view, to have all the resources of an entire independent computer. That is, the logical processor 220 or 222 is the object upon which the scheduler 226 in the operating system 218 runs user threads (looking from the operating system down).

The operating system 218, logical processors 220 and 222, O/S interference manager 228, SMT thread mapping information 230, and interference source information 232 in the exemplary embodiment of FIG. 2 are shown in the main memory 118 (e.g., RAM). However, in further embodiments, some or all components of such software are stored in non-volatile memory such as the mass storage device 210, electrically erasable programmable read-only memory space ("EEPROM" or "Flash memory"), RAM drives, and the like.

The network adapter hardware 106 provides an interface to a network 208 for implementing data communications with other computers. Such data communications may be carried out, for example, through data communications networks such as IP networks or in any other way. Communications adapters implement the hardware level of data communications through which one computer sends data communications to another computer, directly or through a network. Examples of communications adapters useful for determining availability of a destination in embodiments of the present invention include modems for wired dial-up communications, Ethernet (IEEE 802.3) adapters for wired network communications, and 802.11 adapters for wireless network communications. Embodiments of the present invention are able to be adapted to work with any data communications connections including present day analog and/or digital techniques or via a future networking mechanism.

Although the exemplary embodiments of the present invention are described in the context of a fully functional computer system, further embodiments are capable of being distributed as a program product via a CD 212 and its equivalents, floppy disk, or other form of recordable media, or via any type of electronic transmission mechanism.

Managing O/S Interference

As discussed above, parallel applications are susceptible to operating system (O/S) interference or jitter. The O/S interference manager 228 improves the performance of the parallel applications by minimizing the de-synchronization among application tasks caused by interference events (i.e., hardware, O/S, runtime, and management system activities that are external to the applications). The O/S interference manager 228 is aware of the details of SMT threads (i.e., hardware threads) and logical processors (CPUs) on a system 102 via the SMT thread mapping information 230. The O/S interference manager 228 also takes into account possible interference between two or more SMT threads that share resources on the same core (e.g., physical processors 122 and 204) during co-scheduling and synchronization of parallel tasks. The O/S interference manager 228 exploits the additional hardware threads, cores, and/or logical CPUs that previously have not been efficiently exploited to off-load non-application related activities, (i.e., jitter events) and improve the performance of the applications. In other words, the O/S interference manager 228 utilizes the SMT thread mapping information 230 to select a range of logical CPUs that can be dynamically allocated to manage non-application related interruptions in a synchronized manner.

Figure 3:
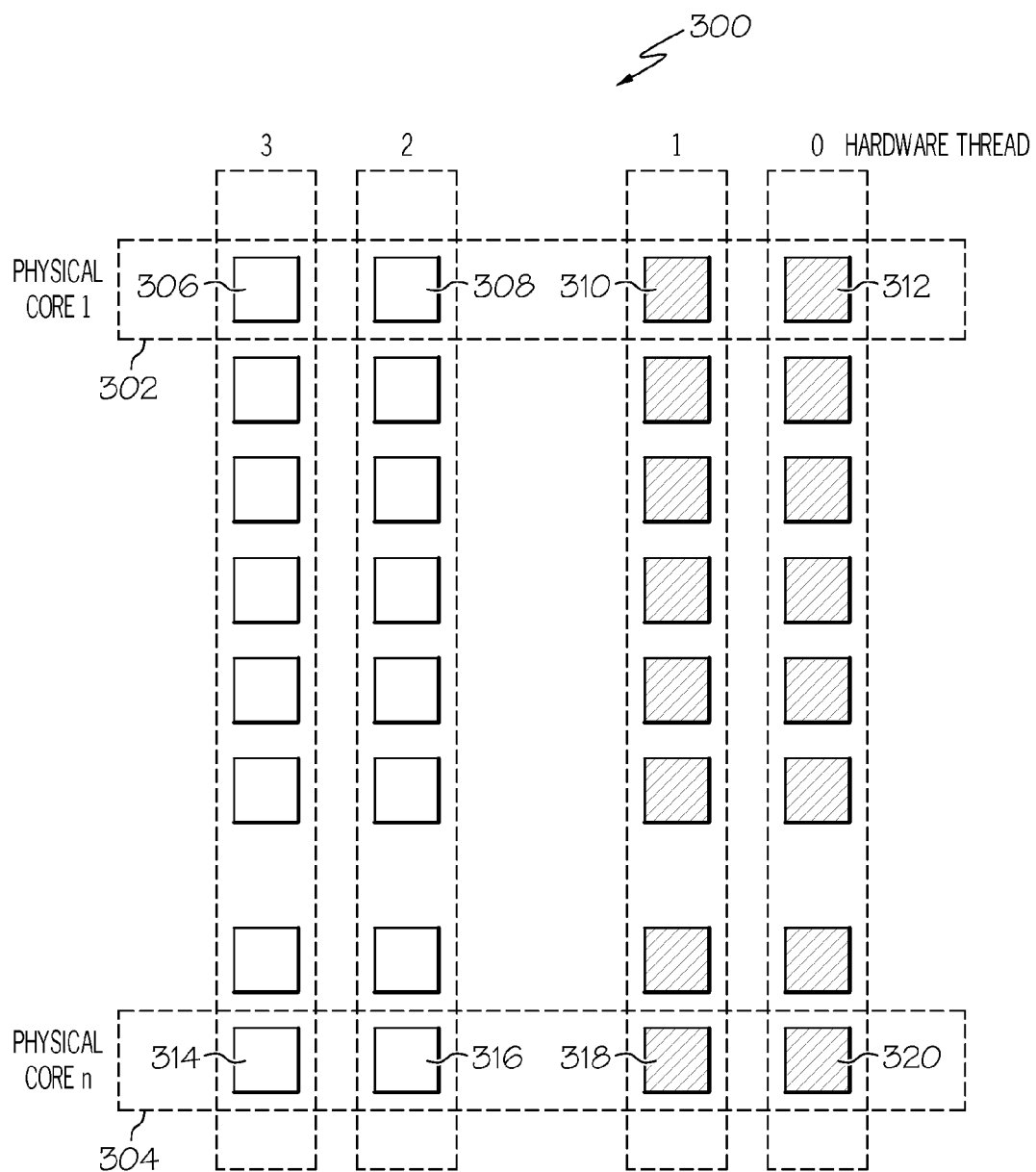
FIG. 3 illustrates an SMT thread to logical CPU mapping configuration according to one embodiment of the present invention.

In one embodiment, the O/S interference manager 228 analyzes the SMT architecture of the system(s) 102 and 104 to determine an SMT thread mapping 230. For example, FIG. 3 shows an exemplary SMT architecture in accordance with one embodiment of the present invention. As shown, multiple physical processing cores 302 and 304 each comprise multiple SMT threads. In the illustrated example, a first physical core 302 comprises SMT threads 306 to 312 and a second physical code 304 comprises SMT threads 314 to 320. Each of the SMT threads of each physical core 302 and 304 is mapped to a logical CPU (such as LP1 220 and LPN 222) by the O/S 218.

The O/S interference manager 228 determines the SMT architecture and mapping and stores this information in the SMT thread mapping information 230. Alternatively, the SMT thread mapping information 230 can be previously generated and this information 230 can be accessed to determine the architecture and mapping. Although the example of FIG. 3 shows an "SMT-4" mode in which each physical core has four logical CPUs capable of executing four SMT threads, further embodiments of the present invention are applicable to any "SMT-X" mode, where X>1.

The O/S interference manager 228, for one or more of the physical processors 122 and 204, identifies a set of logical CPUs from the logical CPUs associated with the physical cores 302 and 304 that comprise the least amount of O/S interference jitter. For example, the O/S interference manager 228 analyzes/monitors each of the logical CPUs 306 to 312 of the first physical core 302 of FIG. 3 to detect O/S interference/jitter events. Based on this analysis/monitoring, the O/S interference manager 228 identifies the logical CPUs with the least amount of jitter events. In the example of FIG. 3, logical CPU 306 and logical CPU 308 are identified by the O/S interference manager 228 as the logical CPUs with the least amount of O/S interference (from logical CPUs 306 to 312). The O/S interference manager 228 then groups one or more of these identified logical CPUs 306 and 308 into a set of interference free CPUs for executing an application 207 of the physical core 302. One or more of the remaining logical CPUs 310 and 312 are then grouped into a set of O/S interference CPUs where the O/S jitter events are to occur.

In another embodiment, one or more additional sets of logical CPUs are created from the remaining set of CPUs for handling application tasks, O/S interference events, and/or other processes (such as, but not limited to, file system management daemons). While the exemplary embodiment of FIG. 3 shows that two of the logical CPUs of each physical core have been designated as interference free CPUs and the remaining two logical CPUs have been designated as O/S interference CPUs, any other possible combinations can be designated as long as there is at least one interference free logical CPU and at least one O/S interference logical CPU.

Once the set of O/S interference CPUs is identified for a given physical core 302, the O/S interference manager 228 binds the application tasks associated with that physical core 302 to one or more of the O/S interference free CPUs 306 and 308. For example, an O/S system call is used to bind the application tasks to one or more of the O/S interference free CPUs 306 and 308. Also, the O/S scheduling priority of the application can be adjusted (i.e., increased). This adjusting of the O/S scheduling priority of the application 207 (i.e., making it more favored) decreases the likelihood that the application 207 will be preempted by more favored process or thread.

The O/S interference manager 228 also identifies the jitter events associated with the physical core 302. This information, in this embodiment, is stored in the interference source information 232. Based on identifying the jitter events, the O/S interference manager 228 moves/schedules the jitter events to operate on one or more of the O/S interference CPUs 310 and 312. For example, the O/S interference manager 228 masks device interrupts on the O/S interference free CPUs 306 and 308. This redirects the device interrupts to one or more of the O/S interference CPUs 310 and 312. The O/S interference manager 228 also moves/schedules third party daemons and system daemons to the O/S interference free CPUs 306 and 308. Jitter events such as timers, particularly timers that cannot be migrated from an O/S interference free CPU 306 to an O/S interference CPU 310, are synchronized by the O/S interference manager 228 using a globally synchronized clock. For example, if the timers are not synchronized, even a single instance of a timer will slow down the entire application 207. Synchronizing all N instances of the timer effectively makes these instances a single instance from a jitter point of view, resulting in the application only slowing down one time rather than N times. In another example, the O/S interference manager 228 uses a global clock to synchronize a timer, such as the decrementer (i.e., global tick), on all CPUs (logical and physical) in the system to reduce the aggregate jitter effect.

In addition to identifying jitter events associated with the physical core 302, the O/S interference manager 228 also identifies the jitter events associated with each of the applications 207 to be operated on the physical core 302. This information can also be stored in the interference source information 232. Among these application jitter events the O/S interference manager 228 identifies the events that are limited to individual process threads, such as a Low-Level Application Programming Interface (LAPI) timer, and moves/schedules these offending process threads to one or more of the O/S interference CPUs 310 and 312. Any remaining sources of jitter events associated with an application can be tuned by the O/S interference manager 228. For example, the O/S interference manager 228 can reduce the frequency of a decrementer interrupt by increasing the interval of the decrementer on the O/S interference free CPUs 306 and 308 to avoid interruptions of the applications 207 running on those logical CPUs 306 and 308.

In addition to creating a class of interference and jitter-free logical CPUs, the O/S interference manager 228 also manages the interference experienced by an application 207 executing on one or more of the O/S interference free CPUs 306 and 308 that is caused by O/S interference/jitter from another SMT thread 205 on the same physical core 302. Examples of this type of O/S interference/jitter are SMT thread resource contention, chip-level resource contention (e.g., cache), and node-level resource contention (e.g., memory bus, disk, and adapter).

In this embodiment, the O/S interference manager 228 manages O/S interference/jitter by limiting or reducing this interference. For example, the O/S interference manager 228 co-schedules the O/S interference by allowing the O/S interference event to only run for relatively small configurable windows of time, such as 1%-5% of the cycles, which affords the application 95%-99% of the cycles with little or no chance on shared resources. The O/S interference manager 228 then utilizes a global clock to synchronize these configurable windows across all nodes used by the application 207. In one example, the O/S interference manager 228 co-schedules the OS/interference using favored and unfavored windows on one or more of the O/S interference CPUs 310 and 312 to minimize device interrupts generated by the O/S interference to a small window of time such as about 3% of total cycles. In another example, the O/S interference manager 228 co-schedules the O/S Interference using favored and unfavored windows on one or more of the O/S interference CPUs 310 and 312 to limit potential SMT sister thread interference to a small window of time such as about 3% of total cycles.

The favored co-scheduling windows (which are configured larger) and unfavored co-scheduling windows (which are configured smaller) are created by the O/S interference manager 228, for example, by using local and global run queues (LRQs and GRQs) and modifying the O/S dispatch code to dispatch the interference events based on the favored and unfavored co-scheduling windows. In this embodiment, the interference events are forced onto a GRQ before the application 207 runs. Some processes (such as the application 207) are prevented from being forced onto the GRQ. In one embodiment, the interference events are forced onto the GRQ by an O/S command. With respect to modifying the dispatch code, the O/S interference free CPUs 306 and 308 are effectively commandeered by the application 207 (due to the binding and scheduling priority adjustment). However, the modified dispatch code allows the O/S interference CPUs 310 and 312 to dispatch work from both the GRQ and LRQ during an unfavored window. As such, during the favored windows (typically 95%-99% of the cycles) the interference/jitter on the O/S interference CPUs 310 and 312 cannot interfere (directly or indirectly) with the application 207. In one embodiment, the O/S interference manager 228 notifies the O/S dispatch code which CPUs are intended for interference/jitter. The O/S interference manager 228 supports per-thread movement from the local to global queue to allow co-scheduling individual threads within an application 207 that have interference/jitter impact (e.g., LAPI timer threads). The O/S interference manager 228 also supports per-thread movement from the global to local run queue to avoid co-scheduling response time-sensitive threads (e.g., file system management daemon).

O/S interference/jitter can further be managed by the application 207 performing SMT hardware priority adjustment to bias core resources in favor of the O/S interference free CPUs 306 and 308. For example, the application 207 can raise the priority of the O/S interference free CPUs 306 and 308. In one embodiment, the O/S interference manager 228 lowers the priority of the O/S interference CPUs 310 and 312. Adjusting this priority minimizes SMT sister thread interference and ensures that more resources (e.g., FPU) are available to the O/S interference free CPUs 306 and 308. Adjusting SMT hardware priority helps make the O/S interference free CPUs 306 and 308 interference free.

Accordingly, embodiments of the present invention improve parallel application performance by utilizing additional logical CPUs that are not used by applications. A set of logical CPUs are selected based on the mapping of SMT threads to physical cores such that these selected logical CPUs can be dynamically allocated to handle non-application related interruptions in a synchronized manner. The logical CPUs selected to mange O/S interference and the logical CPUs reserved for applications share physical resources to reduce the interference/jitter effect on the application CPUs while still maximizing core utilization and throughput.

Operational Flow Diagrams

Figure 4:
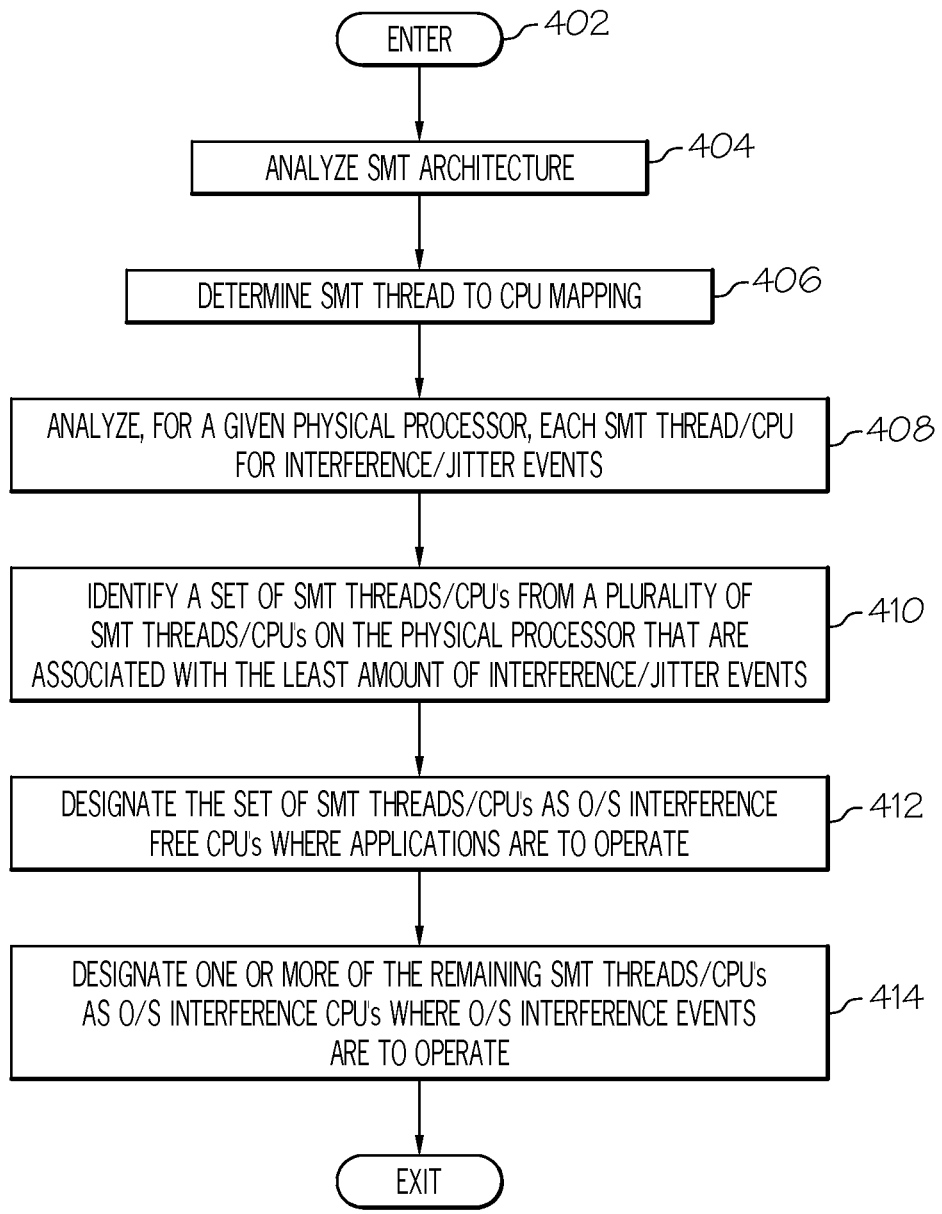
FIGS. 4-6 are operational flow diagrams illustrating processes for managing O/S interference/jitter events to increase application performance according to embodiments of the present invention.

FIG. 4 is an operational flow diagram illustrating a process for managing O/S interference/jitter by creating a class of interference free logical CPUs in accordance with one embodiment of the present invention. The operational flow diagram of FIG. 4 begins at step 402 and flows directly to step 404. The O/S interference manager, at step 404, analyzes the SMT architecture of the system 102. Based on this analysis the O/S interference manager, at step 406, determines the SMT thread to logical CPU mapping. In this embodiment, the SMT thread to logical CPU mapping information is stored in the SMT thread mapping information. The O/S interference manager, at step 408, analyzes, for a given processor, each SMT thread/logical CPU that has been identified for O/S interference/jitter sources.

The O/S interference manager, at step 410, identifies a set of SMT threads/logical CPUs from the SMT threads/logical CPUs on the processor that are associated with the least amount of interference/jitter sources. The O/S interference manager, at step 412, designates the set of SMT threads/logical CPUs as O/S interference free logical CPUs where the applications are to execute. The O/S interference manager, at step 414, designates one or more of the remaining SMT threads/logical CPUs as O/S interference logical CPUs where O/S interference/jitter events are to be handled. One or more additional sets of logical CPUs can be created from the remaining SMT threads/logical CPUs. These one or more sets can be used to manage application tasks, O/S interference events, and/or other processes (such as file system management daemons). The control flow then exits.

Figure 5:
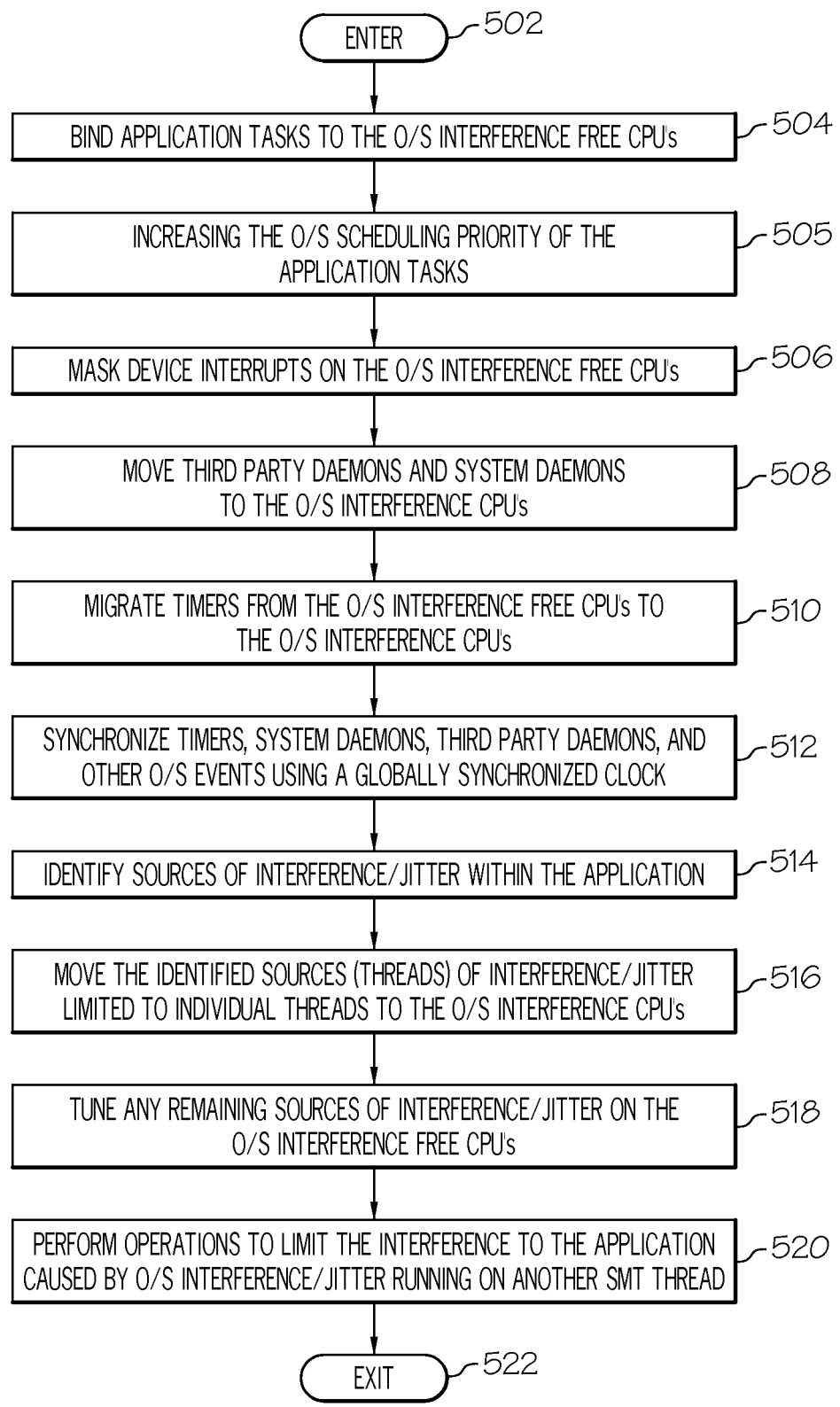

FIG. 5 is an operational flow diagram illustrating a process for managing and limiting O/S interference in accordance with one embodiment of the present invention. The operational flow diagram of FIG. 5 begins at step 502 and flows directly to step 504. The O/S interference manager, at step 504, binds application tasks to the set of O/S interference free logical CPUs. The O/S interference manager, at step 505, increases the o/s scheduling priority of the application tasks. The O/S interference manager, at step 506, masks device interrupts on the O/S interference free logical CPUs. This redirects the device interrupts to the O/S interference logical CPUs.

The O/S interference manager, at step 508, moves third-party and system daemons to the O/S interference logical CPUs. The O/S interference manager, at step 510, migrates timers from the O/S interference free logical CPUs to the O/S interference logical CPUs. The O/S interference manager, at step 512, synchronizes timers, system daemons, third-party daemons, and other O/S events using a globally synchronized clock. The O/S interference manager, at step 514, identifies sources of interference/jitter within the application(s) running on the O/S interference free logical CPU(s). The O/S interference manager, at step 516, moves the identified sources (process threads) of interference limited to individual process threads to the O/S interference logical CPUs. The O/S interference manager, at step 518, tunes any remaining sources of interference/jitter on the O/S interference free logical CPUs. The O/S interference manager, at step 520, performs operations to limit the interference to the application caused by O/S interference events running on another SMT thread. The control flow then exits.

Figure 6:
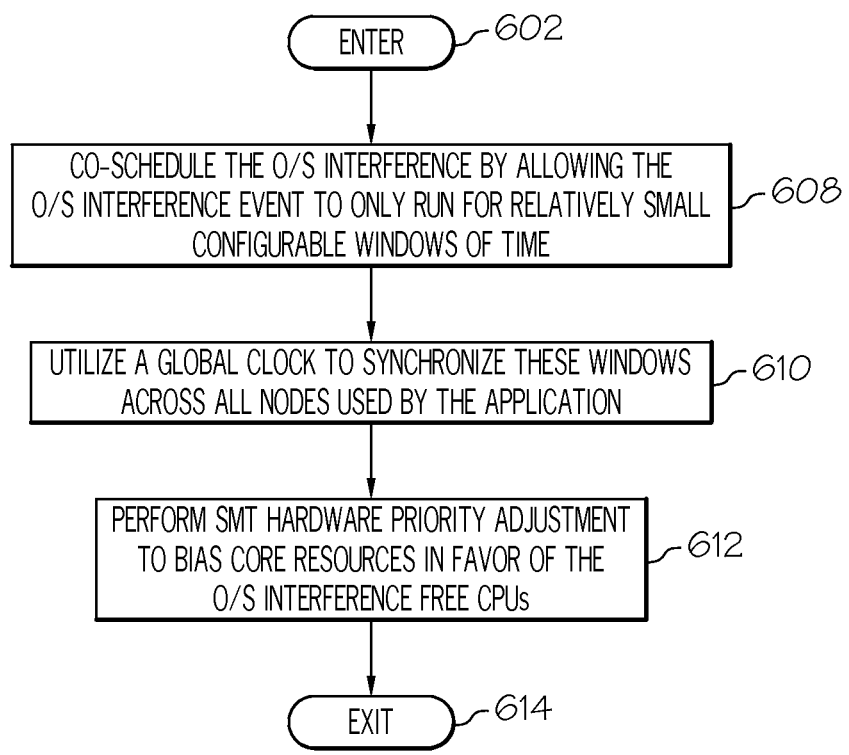

FIG. 6 is an operational flow diagram illustrating a process for performing operations to limit the interference to the application caused by O/S interference running on another SMT thread (step 520 of FIG. 5) in accordance with one embodiment of the present invention. The operational flow diagram of FIG. 6 begins at step 602 and flows directly to step 606. The O/S interference manager, at step 608, co-schedules the O/S interference by allowing the O/S interference event to only run for relatively small configurable windows of time. The O/S interference manager, at step 610, utilizes a global clock to synchronize these configurable windows across all nodes used by the application. The O/S interference manager, at step 612, performs SMT hardware priority adjustment to bias core resources in favor of the O/S interference free CPUs. The control flow then exits at step 614.

Figure 7:
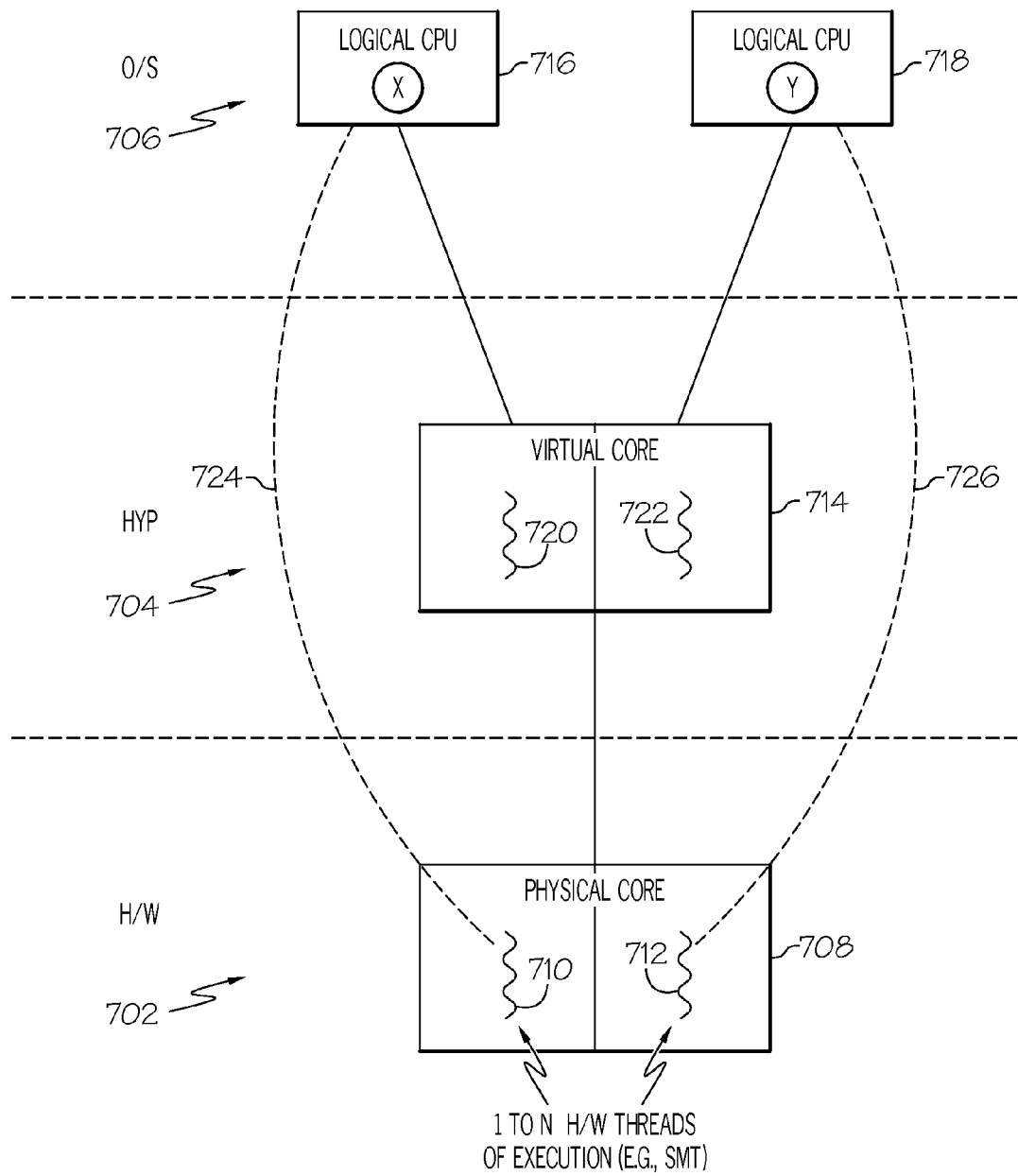
FIG. 7 is a block diagram illustrating various examples of hardware multithreading environment according to embodiments of the present invention.

FIG. 7 illustrates various environments applicable to one or more embodiments of the present invention. In one example, FIG. 7 shows a virtualized environment. This example comprises a hardware layer 702, Hypervisor layer 704, and an O/S layer 706. The hardware layer 702 comprises one or more physical processing cores 708 comprising N hardware threads (e.g., SMT threads) 710 and 712. The hypervisor layer 704 is a layer of system software that runs under the operating system to creating logical partitions. That is, a hypervisor 704 runs between the operating system 706 and the underlying physical computer components including physical processors 708. It is the function of the hypervisor, among other things, to schedule virtual processors 714 on physical processors 708. The O/S layer 706 comprises a set of logical CPUs 716 and 718 that are mapped to a set of virtualized threads 720 and 722 in the virtual processor/core 714. In another example, the environment of FIG. 7 does not include the Hypervisor layer 704 (i.e., a non-virtualized environment). In this example, the logical CPUs are mapped to the hardware threads 710 and 712 of the physical core 708 as shown by the dashed lines 724 and 726.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for managing operating system interference on applications in a parallel processing system, the computer-implemented method comprising:
   determining a mapping of multi-threading threads to at least one processing core;
   determining, based on the mapping, first and second sets of logical processors of the at least one processing core, the first set including at least one of the logical processors of the at least one processing core, and the second set including at least one of a remainder of the logical processors of the at least one processing core;
   storing a set of interference source information identifying a set of interference sources associated with the at least one processing core and a set of application tasks to be operated on the at least one processing core;
   scheduling, by an operating system being executed by a processor, application tasks only on the logical processors of the first set of logical processors of the at least one processing core based on the set of interference source information; and
   scheduling, based on the set of interference source information, operating system interference events only on the logical processors of the second set of logical processors of the at least one processing core, wherein operating system interference events comprise at least scheduling of daemon processes by the operating system and handling asynchronous events by the operating system,
   wherein scheduling operating system interference events comprises:
       identifying a set of operating system interference sources within the application tasks scheduled on the logical processors of the first set of logical processors, wherein each of the set of operating system interference sources within the application tasks are non-hardware interference sources;
       determining that at least one of the operating system interference sources is bound to an individual process thread associated with one of the logical processors of the first set of logical processors; and
       migrating the individual process thread to one of the logical processors of the second set of logical processors.

2. The computer implemented method of claim 1, wherein determining first and second sets of logical processors comprises:
   analyzing each of the logical processors of the at least one processing core to detect operating system interference events; and identifying the logical processors having a least amount of operating system interference events as the first set of logical processors of the at least one processing core.

3. The computer implemented method of claim 1, wherein determining first and second sets of logical processors comprises:
analyzing the remainder of the logical processors;
identifying a subset of the remainder of the logical processors as the second set of logical processors of the at least one processing core; and
identifying another subset of the remainder of the logical processors as a third set of logical processors of the at least one processing core.

4. The computer implemented method of claim 1, further comprising:
binding the application tasks to the logical processors of the first set of logical processors.

5. The computer implemented method of claim 1, wherein scheduling operating system interference events further comprises masking device interrupts on the logical processors of the first set of logical processors, the masking of the device interrupts redirects the interrupts to at least one of the logical processors in the second set of logical processors.

6. The computer implemented method of claim 1, wherein scheduling operating system interference events further comprises migrating a set of timers associated with the logical processors of the first set of logical processors to the logical processors of the second set of logical processors.

7. The computer implemented method of claim 1, wherein scheduling operating system interference events further comprises synchronizing at least one of a set of timers, a set of system daemons, a set of third party daemons, and a set of operating system events associated with at least one of one or more of the logical processors of the first set of logical processors and one or more logical processors of the second set of logical processors with a globally synchronized clock.

8. The computer implemented method of claim 1, wherein scheduling operating system interference events further comprises scheduling the operating system interference events to run only during configurable windows of time.

9. The computer implemented method of claim 1, wherein scheduling operating system interference events further comprises:
raising a hardware thread priority level associated with the first set of logical processors; and
lowering a hardware thread priority level associated with the second set of logical processors.

10. The computer implemented method of claim 1, further comprising:
adjusting an operating system scheduling priority of an application associated with the application tasks to be higher than an operating system scheduling priority associated with the operating system interference events.

11. The computer implemented method of claim 1, further comprising:
identifying at least one operating system interference event remaining on at least one of the logical processors in the first set of logical processors; and
adjusting the at least one operating system interference event so that it occurs less frequently.

12. The computer implemented method of claim 1, wherein scheduling operating system interference events further comprises moving at least one of a set of system daemons and a set of third-party daemons and any other operating system event from the first set of logical processors to the second set of logical processors.

13. The method of claim 1, further comprising:
determining that at least one application task executing on at least one of the first set of logical processors experiences an indirect interference from at least one other logical processor on the same physical processing core; and
co-scheduling the indirect interference with the at least one application task, wherein the indirect interference based on configurable windows of time.

14. An information processing system for managing operating system interference on applications in a parallel processing system, the information processing system comprising:
a memory;
at least one processor communicatively coupled to the memory; and
an operating system interference manager communicatively coupled to the memory and the processor, the operating system interference manager configured to perform a method comprising:
determining a mapping of hardware multi-threading threads to at least one processing core;
determining, based on the mapping, first and second sets of logical processors of the at least one processing core, the first set including at least one of the logical processors of the at least one processing core, and the second set including at least one of a remainder of the logical processors of the at least one processing core;
storing a set of interference source information identifying a set of interference sources associated with the at least one processing core and a set of application tasks to be operated on the at least one processing core;
scheduling application tasks only on the logical processors of the first set of logical processors of the at least one processing core based on the set of interference source information; and
scheduling, based on the set of interference source information, operating system interference events only on the logical processors of the second set of logical processors of the at least one processing core, wherein operating system interference events include at least scheduling of daemon processes by the operating system and handling asynchronous events by the operating system,
wherein scheduling operating system interference events comprises:
identifying a set of operating system interference sources within the application tasks scheduled on the logical processors of the first set of logical processors, wherein each of the set of operating system interference sources within the application tasks are non-hardware interference sources;
determining that at least one of the operating system interference sources is bound to an individual process thread associated with one of the logical processors of the first set of logical processors; and
migrating the individual process thread to one of the logical processors of the second set of logical processors.

15. The information processing system of claim 14, wherein determining first and second sets of logical processors comprises:
analyzing each of the logical processors of the at least one processing core to detect operating system interference events;

identifying the logical processors having a least amount of operating system interference events as the first set of logical processors; and identifying another subset of the remainder of the logical processors as a third set of logical processors of the at least one processing core.

16. A computer program product for managing operating system interference on applications in a parallel processing system, the computer program product comprising:

a non-transitory computer readable storage medium having computer readable program code embodied therewith, the computer readable program code being configured to perform a method comprising:

determining a mapping of hardware multi-threading threads to at least one processing core;

determining, based on the mapping, first and second sets of logical processors of the at least one processing core, the first set including at least one of the logical processors of the at least one processing core, and the second set including at least one of a remainder of the logical processors of the at least one processing core;

storing a set of interference source information identifying a set of interference sources associated with the at least one processing core and a set of application tasks to be operated on the at least one processing core;

scheduling application tasks only on the logical processors of the first set of logical processors of the at least one processing core based on the set of interference source information; and scheduling, based on the set of interference source information, operating system interference events only on the logical processors of the second set of logical processors of the at least one processing core, wherein operating system interference events include at least scheduling of daemon processes by the operating system and handling asynchronous events by the operating system, wherein scheduling operating system interference events comprises:

identifying a set of operating system interference sources within the application tasks scheduled on the logical processors of the first set of logical processors, wherein each of the set of operating system interference sources within the application tasks are non-hardware interference sources;

determining that at least one of the operating system interference sources is bound to an individual process thread associated with one of the logical processors of the first set of logical processors; and migrating the individual process thread to one of the logical processors of the second set of logical processors.

17. The computer program product of claim 16, wherein scheduling operating system interference events further comprises masking device interrupts on the logical processors of the first set of logical processors, the masking of the device interrupts redirecting the interrupts to at least one of the logical processor in the second set of logical processors.

* * * * *